United States Patent
Pedersen

[15] 3,696,417
[45] Oct. 3, 1972

[54] SIGNAL PROCESSOR

[72] Inventor: Norman E. Pedersen, Wilmington, Mass.

[73] Assignee: Panametrics, Inc., Waltham, Mass.

[22] Filed: July 2, 1970

[21] Appl. No.: 51,845

[52] U.S. Cl. ..................343/7.7, 343/5 PD, 343/8
[51] Int. Cl. ............................................G01s 9/42
[58] Field of Search ..................343/5 DD, 7.7, 8

[56] References Cited

UNITED STATES PATENTS 3,018,477   1/1962   Brault et al. ................343/7.7
3,631,490   12/1971  Palmieri ......................343/7.7

Primary Examiner—T. H. Tubbesing
Attorney—Kenway, Jenney & Hildreth

[57] ABSTRACT

In the signal processor disclosed herein, the respective sets of echo signals reflected back from an environment in response to a radiated signal comprising a pair of adjacent frequency components are modified according to a preselected time-amplitude function and are cross-combined so as to generate an output signal whose amplitude varies as a function of the net displacement of a target within the environment. Further, the output signal is relatively insensitive to moving clutter which does not undergo a substantial net displacement.

6 Claims, 1 Drawing Figure

PATENTED OCT 3 1972
3,696,417
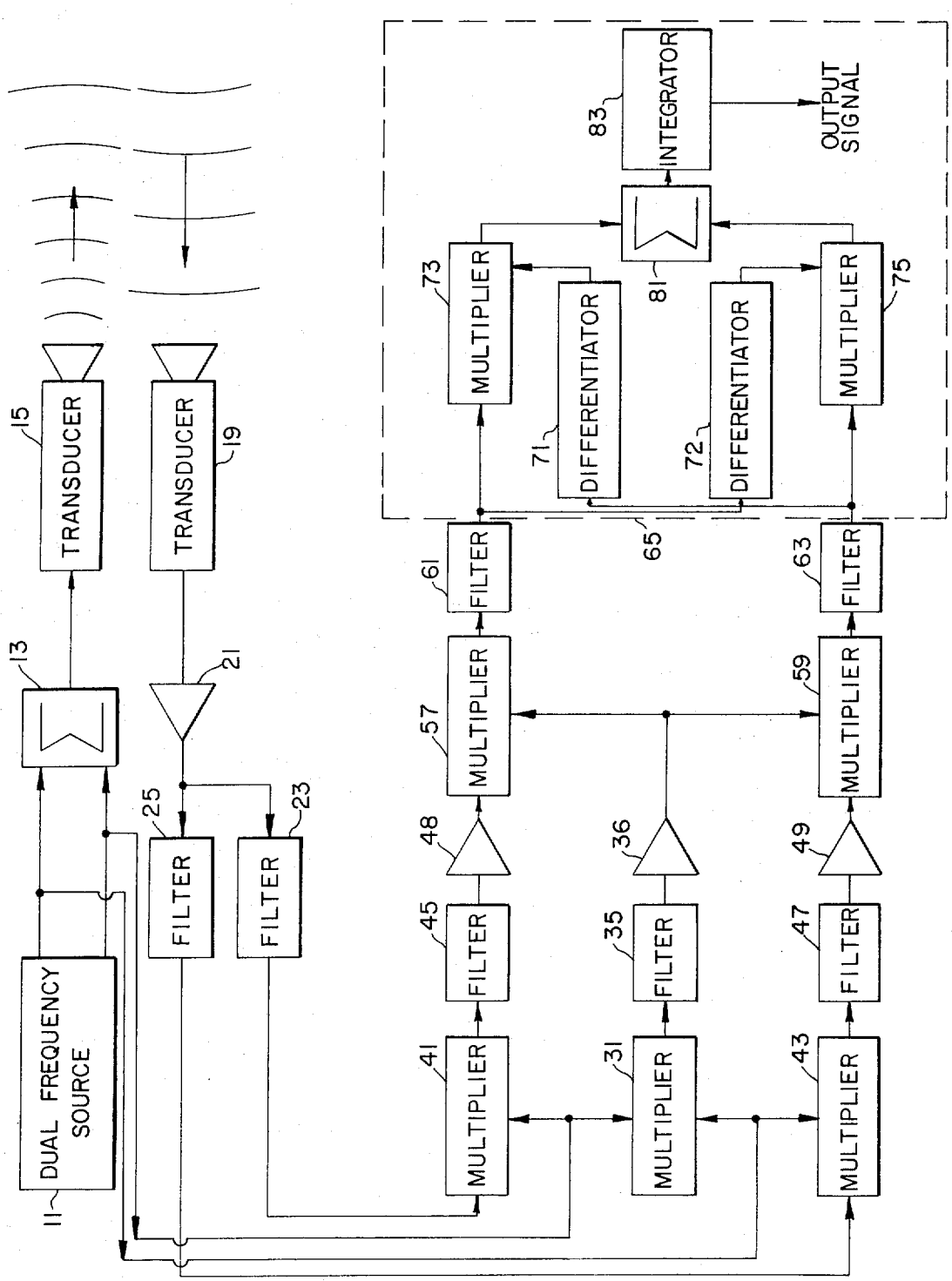
INVENTOR
NORMAN E. PEDERSEN
BY
Kenway, Jenney + Hildreth
ATTORNEYS

SIGNAL PROCESSOR

BACKGROUND OF THE INVENTION

This invention relates to a signal processor and more particularly to apparatus for processing the Doppler shifted components of a pair of echo signals produced in response to a transmitted signal comprising a pair of adjacent frequency components.

In the fields of radar and sonar technology, it has long been recognized that echo signals obtained from a moving target can be distinguished from those signals returned from a stationary background (fixed clutter) by examining the Doppler shifted components of the echo signal. Systems which display or recognize only the Doppler shifted echo components are well known and are typically referred to as moving target indicators (MTI). While such moving target indicators provide good differentiation between a moving target and background signals associated with stationary targets, such systems do not provide differentiation or separation between those targets which undergo relatively large net displacements, e.g., those which move relatively steadily on a definite course, and those which are merely reciprocating non-periodically or moving randomly around a generally fixed location. In other words, moving clutter is relatively indistinguishable from a desired target in conventional moving target indicator designs, when the Doppler returns of the moving target and the moving clutter occupy the same bandwidth. This difficulty with randomly moving clutter has heretofore substantially limited the success of various intrusion detection systems whether they employ electromagnetic energy, i.e., radar systems, or acoustic energy, i.e., sonar systems.

Among the several objects of the present invention may be noted the provision of a signal processor which operates on Doppler shifted echo signals and which provides an output signal which is a function of the net displacement of a target from which echo signals are returned over a preselected integration period; the provision of such a signal processor which is relatively insensitive to echo signals produced by a target which moves reciprocally or which moves randomly around a generally fixed location; the provision of such a signal processor which provides an output signal which varies as a function of the net displacement of a target substantially independently of its path; the provision of such a signal processor which operates on respective sets of echo signals reflected back from an environment in response to a radiated signal comprising a pair of adjacent frequency components; the provision of such apparatus which is relatively insensitive to noise; the provision of such apparatus which employs synchronous detection and demodulation; the provision of such apparatus which is reliable and which is relatively simple and inexpensive. Other objects and features will be in part apparent and in part pointed out hereinafter.

SUMMARY OF THE INVENTION

Briefly, apparatus according to the present invention is operative to process the Doppler shifted components of respective sets of echo signals reflected back from an environment in response to a radiated signal which comprises a pair of adjacent frequency components. The echo signals are detected or demodulated so as to generate respective sets of Doppler information signals having frequency components equal in frequency to the respective Doppler shift frequencies. Each of the Doppler information signals is then differentiated to provide a respective differential signal. A first product signal is generated having an amplitude which is proportional to the product of the amplitude of one of the Doppler information signals with the amplitude of the differential signal corresponding to the other of the Doppler signals. A second product signal is generated having an amplitude which is proportional to the product of the amplitude of the other of the Doppler information signals with the amplitude of the differential signal corresponding to the first Doppler information signal. An output signal is then generated having an amplitude which varies as a function of the time integral of the difference between the amplitudes of the two product signals.

BRIEF DESCRIPTION OF THE DRAWINGS

The single drawing is a block diagram of an echo target sensing system employing a signal processor of the present invention.

DESCRIPTION OF THE PREFERRED EMBODIMENT

As noted previously, the signal processor of the present invention operates on the Doppler information contained in the respective sets of echo signals reflected back from an environment in response to a radiated signal comprising a pair of adjacent frequency components. As is understood, the radiated signal and the echo signals may comprise either electromagnetic energy or acoustic energy depending on the particular use to which the system is to be put. While dual frequency echo interrogation sources have been employed heretofore, these prior uses of two or more frequencies have typically been for different purposes than that for which the present invention is intended and these prior art devices have not operated in the manner of apparatus according to the present invention. Examples of such prior art systems are those disclosed in U. S. Pat. Nos. 3,015,819, 3,018,477 and 3,165,738.

As means for transmitting dual frequency interrogating energy and receiving the corresponding echo signals are well known in the art, as exemplified by the patents identified above, such means are not described in detail hereinafter but are described only insofar as is necessary for an understanding of the signal processing apparatus of the present invention.

In FIG. 1 a dual frequency source is indicated generally at 11. Source 11 is assumed to provide signals at two adjacent frequencies, designated $\omega 1$ and $\omega 2$ (expressed in radians). For reasons which will be apparent hereinafter, it is preferred that these two components be relatively close in frequency, e.g. within one percent. These two signal components are combined or mixed, as indicated at 13, and the sum signal is applied to a suitable transducer 15 for radiating energy at these frequencies into an environment in which it is desired to detect moving targets. In the case of radar applications, the transducer 15 may comprise suitable r.f. power amplifiers and an antenna, while in sonar applications, the transducer may comprise a loudspeaker or other electro-acoustic transducer.

Objects or targets in the environment will reflect a portion of the radiated energy back to the apparatus where it is picked up by a suitable transducer, as indicated at 19. As the echo signals received will typically be of relatively small amplitude, these received signals are passed through a preamplifier, as indicated at 21, so as to be amplified to a level suitable for intermediate processing, as described hereinafter, to extract the Doppler information contained in these signals. While the transmission and reception have been illustrated as being performed by separate transducers in the embodiment illustrated for the purpose of simplicity of explanation, it will be understood by those skilled in the art that a single transducer or antenna may be used by employing a suitable circulator or other isolation element to prevent an excess of the transmitted power from being introduced directly into the receiver system.

As will also be understood by those skilled in the art, there will be a respective set of echo signals for each of the transmitted frequency components $\omega 1$ and $\omega 2$, each set comprising a component at the original transmitted frequency (reflected back from stationary objects) and a plurality of Doppler shifted components reflected back from moving objects or targets. Since the reflecting object may be moving either toward or away from the apparatus, the Doppler components may be either above or below the respective original transmitted frequency. The two sets of echo signals are separated by respective filters 23 and 25 which have bandwidths sufficient to pass the respective transmitted frequency component together with its associated Doppler components, but which effectively blocks the other of the two transmitted frequencies and its associated Doppler components.

Coherent samples of the transmitted frequency components $\omega 1$ and $\omega 2$, obtained from the source 11, are applied to a multiplier circuit 31 so as to obtain a product signal which includes a component at a frequency which is equal to the difference in frequency between the two original transmitted components. This product signal is applied to a filter 35 which extracts this difference frequency component and the extracted component is amplified as indicated at 36.

Each of the coherent frequency samples obtained from the source 11 is also applied to a respective multiplier circuit 41 and 43 where each is combined with or multiplied by the echo signal corresponding to the other of the original transmitted frequencies. In other words, the set of echo signals corresponding to or produced by the original transmitted frequency $\omega 1$ are multiplied by the $\omega 2$ signal while the set of echo frequencies corresponding to the transmitted frequency $\omega 2$ are multiplied by the signal of frequency $\omega 1$. As is understood, each of the product signals so generated will have a set of frequency components centered nominally on the difference between the two original transmitted frequencies. For convenience, this difference frequency may be considered to be an i.f. (intermediate frequency) of the system. The product signals obtained from the multipliers 41 and 43 are applied to filters as indicated at 45 and 47, respectively, where the i.f. frequency components are separated out and these separated i.f. components are amplified as indicated at 48 and 49. As indicated, the filters 45 and 47 are, like the filter 35, centered on the difference frequency but have bandwidths sufficient to pass Doppler components separated from the i.f. frequency only by the amount of the Doppler shifts.

The substantially pure difference frequency signal obtained from the filter 35 is employed to synchronously detect or demodulate the two sets of Doppler shift components. For this purpose, the substantially pure difference frequency signal is applied to one input of each of a pair of multiplier circuits 57 and 59. One set of echo signals, shifted to the difference or i.f. frequency, is applied to the other input of each multiplier.

The product signals obtained from the multipliers 57 and 59 are applied to respective low pass filters 61 and 63 to eliminate components around the i.f. frequency. The signals remaining after such filtering may be considered to be Doppler information signals. Each such Doppler information signal comprises components which are equal in frequency to the Doppler shift frequencies of the Doppler shifted components in the original set of echo signals. In other words, the Doppler components in the original echo signals have, in effect, been synchronously transposed or heterodyned down to a zero i.f. frequency.

Preferably, the phasing of the difference frequency signal applied to each of the multipliers 57 and 59 is adjusted so that the nominal d.c. component of the multiplier output signal is maintained essentially at a zero level. If desired, a long time constant feedback or servo loop controlling a phase adjuster may be used to automatically maintain such a relationship. When this relationship is maintained and a true multiplier is employed to perform this function which is similar to heterodyning, it can be shown the fluctuations in the source amplitude are substantially cancelled, i.e., are reduced to second order effects. These Doppler information signals are applied to the signal processor, designated generally as 65. For convenience in the later description, the Doppler information signals are referred to as $g_1$ and $g_2$.

In some applications it may be desirable to reduce the dynamic range of the input signals applied to the processor, e.g., by applying a normalizing function, so that the range over which the processor must operate is reduced. Accordingly, as used herein, the term Doppler information signal should be understood to encompass a processor input signal which has been normalized in amplitude as well as one which has not.

In the signal processor 65, each Doppler information signal is applied to a respective differentiator circuit 71 and 72 which provides an output signal which is a differentiated version of the original Doppler information signal. In other words, a time-amplitude dependent transformation function is applied to the Doppler information signal. Each differentiated Doppler information signal is applied to one input of a respective multiplier circuit 73 and 75. To the other input terminal of the multiplier which receives each differentiated Doppler information signal is applied the other or opposite Doppler information signal in undifferentiated form. In other words, there is a cross-combining of information obtained from the two sets of echo signals. In the embodiment illustrated, the undifferentiated information signal is obtained directly from the input to the signal processor but essentially the same information can also be obtained by integrating the previously differentiated signal. This latter method blocks extraneous d.c. level shifts.

The output signals from the two multipliers 73 and 75 are applied, respectively, to the in-phase and inverting inputs of a summing circuit, e.g. a differential amplifier, as indicated at 81. The output signal from the summing circuit is in turn applied to the input terminal of an integrator circuit 83. The time constant of integrator 83 is selected so as to be long in relation to the expected periods of movement of the clutter points.

As both of the signals which drive the integrator 83 are generated by cross-combining signals which are derived from the two different sets of echo signals, it can be seen that the output signals from these multipliers contain components having frequencies which are equal to the difference in frequency between the corresponding Doppler shifted components in the two echo signal sets. Since the time constant of integrator 83 is quite long with respect to the periods of the original Doppler shift frequencies, typically only the Doppler difference components will be represented in the output signal from the integrator. In the simple case in which the only echo signal components are those due to a single target moving toward the apparatus at a constant speed, it can thus be seen that the output signal from the integrator 83 will consist of a single frequency component, which frequency is equal to the difference between the Doppler shifts imposed upon the two original transmitted frequencies by the velocity of the target.

The output signal from the signal processor 65 can, for example, be subjected to spectrum analysis in order to separate out components due to targets having different radial velocities or, for intrusion detection systems, the output signal may merely be applied to an amplitude threshold circuit which controls an alarm. Alternatively, the processor output signal may be subjected to further processing as being merely part of the information collected by a larger echo interrogation system of which the present apparatus is merely a component.

As noted previously, the presence of a single target moving at a constant radial velocity would produce an integrator output signal of substantially a single frequency. In other words, the instantaneous amplitude of the integrator output signal is a periodic function of radial distance to the target. It can therefore be seen that the incremental sensitivity of the integrator output signal to small net movements of a target varies as a periodic function of radial distance. In one sense then, the frequency difference between the two transmitted components establishes a series of zones of relatively high incremental sensitivity. These zones may be conveniently referred to as "coherency zones." If the response of the overall system is confined to a single such zone, e.g. by range gating as is known in the art, the output signal may effectively be treated as a d.c. signal having an amplitude which varies as a target moves through the zone.

While various other systems known in the prior art may operate in certain modes to generate an output signal which has a frequency equal to the difference between Doppler shifts, a singular advantage of the present apparatus is that the output signal is relatively insensitive to reciprocating or random displacements of clutter points in the environment while being quite sensitive to net movement of a target over the integration period. This characteristic of the present invention allows the apparatus to be relatively sensitive to a target which is intruding or moving across an environment under surveillance while it substantially ignores moving clutter such as wind-driven branches, etc., which do not have substantial net displacements over the integration period. In other words, the processor generates an integral which is substantially independent of the path of integration. Thus, only net displacements are indicated.

Assuming that there are N moving energy scatterers or targets in the environment from which energy is being reflected back, the two Doppler information signals $g_1$ and $g_2$ provided to the signal processor can be described as follows:

$$g_1 = \sum_{i=1}^{N} A_i \cos \phi_{1i} \quad (1)$$

$$g_2 = \sum_{j=1}^{N} A_j \cos \phi_{2j} \quad (2)$$

where the phases $\phi_{1i}$ and $\phi_{2j}$ are defined as $$\phi_{1i} \equiv \frac{2\omega_1}{c} R_i(t) \quad (3)$$

$$\phi_{2j} \equiv \frac{2\omega_2}{c} R_j(t) \quad (4)$$

and where $A_i$ is the reflectance coefficient of the $i^{th}$ scatterer; $\omega 1$ $\omega 2$ are the original radiated frequencies; $c$ is the speed of light; and $R_i$ is the radial range to the $i^{th}$ scatterer.

The output signal (I) from the integrator after a time T is then $$I = \int_0^\tau (g_2 \dot{g}_1 - g_1 \dot{g}_2)$$

where $$\dot{g}_1 \equiv \frac{dg_1}{dt} \quad \dot{g}_2 \equiv \frac{dg_2}{dt} \quad (5)$$

Performing the indicated differentiations and substituting, $$I = \sum_i \sum_j A_i A_j \int_0^\tau [\dot{\phi}_{1i} \sin \phi_{1i}(t) \cos \phi_{2j}(t) - \dot{\phi}_{2j} \sin \phi_{2j}(t) \cos \phi_{1i}(t)] dt \quad (6)$$

Equation (6) can be rewritten in terms of an integral over the phases $\phi_{1i}$ and $\phi_{2j}$ as follows:

$$I = \sum_{i=1}^{N} \sum_{j=1}^{N} A_i A_j \int_{(\phi_{1i}, \phi_{2j})_t=0}^{(\phi_{1i}, \phi_{2j})_t=\tau} \sin \phi_{1i} \cos \phi_{2j} d\phi_{1i} - \sin \phi_{2j} \cos \phi_{1i} d\phi_{2j} \quad (7)$$

The terms in the above integral can be divided into two sets of terms, namely the "coherent," or ($i = j$) terms and the "incoherent," or ($i \neq j$) terms. The coherent terms are integrals of exact differentials and are therefore independent of the values taken on by the variables $\phi_{1i}$ and $\phi_{2i}$ during the integration period $0 \lesssim t \lesssim \tau$. The values of the coherent terms depend only upon the values of the various phases $\phi_{1i}$ and $\phi_{2i}$ at the limits of the integration period. Therefore, these terms do not tend to contribute increasingly large random values to the integral as the integration time $\tau$ is increased. This is in contrast to the conventional phase detector or cross correlation, in which devices the coherent terms are of the form $$\Sigma A_i^2 \int_0^\tau g_1(t) g_2(t) dt \qquad (8)$$

Terms of this latter form will produce a net average value which increases proportionately with $(\tau/t)^{1/2}$.

The incoherent terms ($i \neq j$) in equation (7) are highly random since they involve integrals of changes in random phase differences between the various N clutter points.

In view of the foregoing, it may be seen that several objects of the present invention are achieved and other advantageous results have been attained.

As various changes could be made in the above construction without departing from the scope of the invention, it should be understood that all matter contained in the above description or shown in the accompanying drawings shall be interpreted as illustrative and not in a limiting sense. For example, while the signal processor illustrated employs analog functional components, it can be seen that the operation of each of these components and hence the operation of the overall processor can be simulated by digital computation using an appropriately programmed general purpose digital computer. Accordingly, such an embodiment should be understood to fall within the scope of the present claims.

What is claimed is:

1. Apparatus for processing the Doppler shifted components of respective sets of echo signals reflected back from an environment in response to a radiated signal comprising a pair of adjacent frequency components, said apparatus comprising:

means for generating from said echo signals respective sets of Doppler information signals having frequency components equal in frequency to the respective Doppler shift frequencies;

means for differentiating each of said Doppler information signals thereby to provide a respective differential signal;

means for generating a first product signal having an amplitude which is proportional to the product of the amplitude of a first of said Doppler information signals with the amplitude of the differential signal corresponding to the other of said Doppler information signals;

means for generating a second product signal having an amplitude which is proportional to the product of the amplitude of the other of said Doppler information signals with the amplitude of the differential signal corresponding to said first Doppler information signal; and means for generating an output signal having an amplitude which varies as a function of the time integral of the difference between the amplitudes of said product signals.

2. Apparatus for processing the Doppler shifted components of the respective sets of echo signals reflected back by an environment in response to a radiated signal comprising a pair of closely adjacent frequency components, said apparatus comprising:

means for generating from said echo signals respective sets of Doppler information signals having frequency components equal in frequency to the respective Doppler shift frequencies;

means for differentiating each of said Doppler information signals thereby to provide respective differential signals;

means for generating a product signal having an amplitude which is proportional to the product of one of said Doppler information signals and the differential signal corresponding to the other of said Doppler information signals; and means for generating an output signal having an amplitude which varies as a function of the time integral of the amplitude of said product signal.

3. Apparatus for processing a pair of Doppler information signals having frequency components equal in frequency to the respective Doppler shift frequencies contained in respective sets of echo signals reflected back from an environment in response to a radiated signal comprising a pair of adjacent frequency components, said apparatus comprising:

means responsive to each of said Doppler information signal for generating a respective transform signal which is a time-amplitude transformation function of the respective Doppler information signal;

means for generating a first product signal having an amplitude which is proportional to the product of the amplitude of a first of said Doppler information signals with the amplitude of the transform signal corresponding to the other of said Doppler information signals;

means for generating a second product signal having an amplitude which is proportional to the product of the amplitude of the other of said Doppler information signals with the amplitude of the transform signal corresponding to said first Doppler information signal; and means for generating an output signal having an amplitude which varies as a function of the time integral of the difference between the amplitudes of said product signals.

4. Apparatus for processing the Doppler shifted components of respective sets of echo signals reflected back from an environment in response to a radiated signal comprising a pair of adjacent frequency components, said apparatus comprising:

means for providing a difference signal having a frequency which is equal to the difference between the two radiated frequency components;

means for combining each of said echo signals with said difference signal to generate a respective Doppler information signal having frequency components equal in frequency to the respective Doppler shift frequencies;

means for differentiating each of said Doppler information signals thereby to provide a respective differential signal;

means for generating a first product signal having an amplitude which is proportional to the product of the amplitude of a first of said Doppler information signals with the amplitude of the differential signal corresponding to the other of said Doppler information signals;

means for generating a second product signal having an amplitude which is proportional to the product of the amplitude of the other of said Doppler information signals with the amplitude of the differential signal corresponding to said first Doppler information signal; and means for generating an output signal having an amplitude which varies as a function of the time integral of the difference between the amplitudes of said product signals.

5. Apparatus for processing the Doppler shifted components of respective sets of echo signals reflected back from an environment in response to a radiated signal comprising a pair of adjacent frequency components, said apparatus comprising:

means for generating signals having frequencies $\omega_1$, $\omega_2$ and $\omega_1-\omega_2$ respectively, the radiated signal comprising frequencies $\omega_1$ and $\omega_2$;

means for combining echo signals based on frequency $\omega_1$ with said signal at frequency $\omega_2$ to obtain a first Doppler i.f. signal based on frequency $\omega_1-\omega_2$;

means for combining echo signals based on frequency $\omega_2$ with said signal at frequency $\omega_1$ to obtain a second Doppler i.f. signal based on frequency $\omega_1-\omega_2$;

means for combining each of said Doppler i.f. signals with said signal at frequency $\omega_1-\omega_2$ to generate a respective Doppler information signal having frequency components equal in frequency to the respective Doppler shift frequencies;

means for differentiating each of said Doppler information signals thereby to provide a respective differential signal;

means for generating a first product signal having an amplitude which is proportional to the product of the amplitude of a first of said Doppler information signals with the amplitude of the differential signal corresponding to the other of said Doppler information signals;

means for generating a second product signal having an amplitude which is proportional to the product of the amplitude of the other of said Doppler information signals with the amplitude of the differential signal corresponding to said first Doppler information signal; and means for generating an output signal having an amplitude which varies as a function of the time integral of the difference between the amplitudes of said product signals.

6. Apparatus as set forth in claim 5 wherein each of said signal combining means comprises a multiplier.

* * * * *